(12) United States Patent
Tamiya

(10) Patent No.: US 8,661,091 B2
(45) Date of Patent: Feb. 25, 2014

(54) IMAGE PROCESSING APPARATUS AND IMAGE PROCESSING METHOD

(75) Inventor: Keisuke Tamiya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 202 days.

(21) Appl. No.: 12/780,665

(22) Filed: May 14, 2010

(65) Prior Publication Data

US 2010/0318607 A1    Dec. 16, 2010

(30) Foreign Application Priority Data

Jun. 12, 2009    (JP) .................................. 2009-141618

(51) Int. Cl.
*G06F 15/16*    (2006.01)

(52) U.S. Cl.
USPC ............................ 709/217; 709/219; 358/446

(58) Field of Classification Search
USPC ................................................ 709/204, 217
See application file for complete search history.

(56) References Cited

U.S. PATENT DOCUMENTS

| | | | |
|---|---|---|---|
| 7,937,582 B1 * | 5/2011 | Lee | 713/155 |
| 8,111,414 B2 | 2/2012 | Sato et al. | |
| 2006/0004867 A1 * | 1/2006 | Tamai et al. | 707/104.1 |
| 2007/0255734 A1 | 11/2007 | Morimoto | |
| 2008/0091796 A1 * | 4/2008 | Story et al. | 709/217 |
| 2008/0243818 A1 * | 10/2008 | Ming | 707/5 |
| 2008/0281832 A1 * | 11/2008 | Pulver et al. | 707/100 |
| 2009/0080013 A1 * | 3/2009 | Sato et al. | 358/1.15 |
| 2009/0273814 A1 * | 11/2009 | Ohkawa | 358/448 |
| 2010/0138371 A1 | 6/2010 | Ishii | |
| 2010/0239160 A1 * | 9/2010 | Enomoto et al. | 382/165 |

FOREIGN PATENT DOCUMENTS

| | | |
|---|---|---|
| JP | 2005-346501 A | 12/2005 |
| JP | 2006-323610 A | 11/2006 |
| JP | 2007-312363 A | 11/2007 |
| WO | 2009-019784 A | 2/2009 |

* cited by examiner

*Primary Examiner* — Abdullahi Salad

(74) *Attorney, Agent, or Firm* — Fitzpatrick, Cella, Harper & Scinto

(57) ABSTRACT

A digital document is generated based on document content information obtained by reading a paper document, and instruction content information for document generation. Explanatory information of the paper document is generated based on the instruction content information. Feed data as data used to notify an external apparatus of generation of the digital document is generated with reference to the explanatory information. The feed data is transmitted to the external apparatus in response to a request from the external apparatus.

17 Claims, 20 Drawing Sheets

FIG. 3A

```
<html>
 <head>
  <title> PUBLIC FOLDER OF PRINTER A</title>
  <link id>="publicfolder1" type="application/atom+xml" rel="alternate"
        href="http:// www.example.com/publicfolder1/feed/atom.xml"></link>
  <link id>="publicfolder2" type="application/atom+xml" rel="alternate"
        href="http:// www.example.com/publicfolder2/feed/atom.xml"></link>
        . . .
 </head>
 <body>
  <h1>PUBLIC FOLDER LIST</h1>
  <ul>
  <li><a type="application/atom+xml"
        href="http:// www.example.com/publicfolder1/feed/atom/xml">UPDATE
INFORMATION OF PUBLIC FOLDER FOR XXX GROUP MEMBER</a></li>
  <li><a type="application/atom+xml"
        href="http:// www.example.com/publicfolder2/feed/atom/xml">UPDATE
INFORMATION OF PUBLIC FOLDER FOR YYY GROUP MEMBER</a></li>
        . . .
  <ul>
 </body>
</html>
```

FIG. 3B

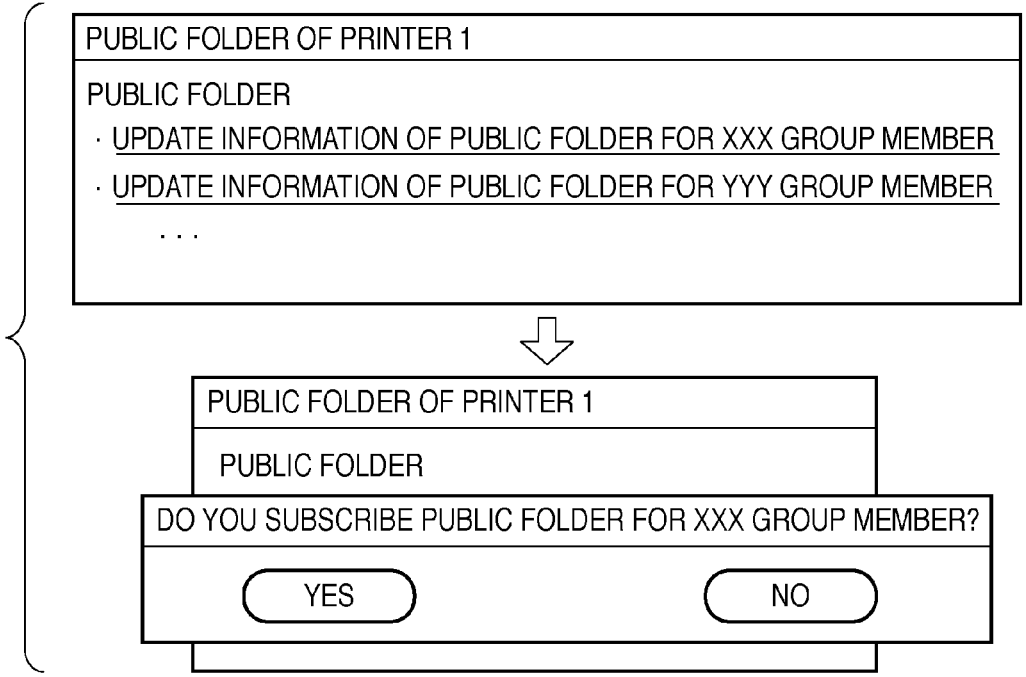

FIG. 4

SHARED FOLDER FOR XXX GROUP MEMBER

SHARED FOLDER FOR XXX GROUP MEMBER
OCTOBER 6, 2007 (12 : 10 : 00)

REGULAR CONFERENCE-2007-10-04-RECORD
OCTOBER 4, 2007 (12 : 50 : 40)

DOWNLOAD
- PDF FORMAT JAPANESE
- PDF FORMAT ENGLISH
- XPS FORMAT JAPANESE DIGITAL SIGNATURE = ON

REGULAR CONFERENCE-2007-10-04-ASSIGNMENT
OCTOBER 6, 2007 (12 : 10 : 00)

DOWNLOAD
- PDF FORMAT JAPANESE
- PDF FORMAT ENGLISH
- XPS FORMAT JAPANESE DIGITAL SIGNATURE = ON

FIG. 5A

```
<?xml version="1.0" encoding="utf-8"?>
<feed xmlns="http:// www.w3.org/2005/Atom">
    <title>XXX GROUP SHARED FOLDER</title>
    <link rel="self" href="http:// mfp0001.example.org/publicfolder1/feed/atom.xml"/>
    <updated>2007-10-03T 10:20:00Z</updated>
    <author><name>mfp0001.example.org</name></author>
    <id>urn:uuid:bfd13eb3-a03c-4431-b627-d0a9ece0efa3</id>
</feed>
```

FIG. 5B

```
<?xml version="1.0" encoding="utf-8"?>
<feed xmlns="http:// www.w3.org/2005/Atom">
    <title>XXX GROUP SHARED FOLDER</title>
    <link rel="self" href="http:// mfp0001.example.org/publicfolder1/feed/atom.xml"/>
    <updated>2007-10-04T 12:50:40Z</updated>
    <author><name>mfp0001.example.org</name></author>
    <id>urn:uuid:bfd13eb3-a03c-4431-b627-d0a9ece0efa3</id>
 <entry>
    <id>urn:uuid:f85e59d7-4a14-4d63-9d3f-85a986b67e6f</id>
    <title>REGULAR CONFERENCE-2007-10-04-RECORD</title>
    <updated>2007-10-04T 12:50:40Z</updated>
    <content>REGULAR CONFERENCE RECORD</content>
    <link rel="enclosure" title="XPS FORMAT JAPANESE DIGITAL SIGNATURE = ON"
        type="application/vnd.ms-xpsdocument" hreflang="ja"
        href="http:// mfp0001.example.org/publicfolder1/200710040001.xps"/>
 </entry>
</feed>
```

FIG. 6A

```
<?xml version="1.0" encoding="utf-8"?>
<feed xmlns="http://www.w3.org/2005/Atom">
  <title>XXX GROUP SHARED FOLDER</title>
  <link rel="self" href="http:// mfp0001.example.org/publicfolder1/feed/atom.xml"/>
  <updated>2007-10-05T 10:10:20Z</updated>
  <author><name>mfp0001.example.org</name></author>
  <id>urn:uuid:bfd13eb3-a03c-4431-b627-d0a9ece0efa3</id>
  <entry>
    <id>urn:uuid:f85e59d7-4a14-4d63-9d3f-85a986b67e6f</id>
    <title>REGULAR CONFERENCE-2007-10-04-RECORD</title>
    <updated>2007-10-05T 10:10:20Z</updated>
    <content>REGULAR CONFERENCE RECORD</content>
    <link rel="enclosure" title="XPS FORMAT JAPANESE DIGITAL SIGNATURE = ON"
      type="application/vnd.ms-xpsdocument" hreflang="ja"
      href="http:// mfp0001.example.org/publicfolder1/200710050001.xps"/>
  </entry>
</feed>
```

F I G. 6B

```
<?xml version="1.0" encoding="utf-8"?>
<feed xmlns="http:// www.w3.org/2005/Atom">
  <title>XXX GROUP SHARED FOLDER</title>
  <link rel="self" href="http:// mfp0001.example.org/publicfolder1/feed/atom.xml"/>
  <updated>2007-10-05T 10:10:20Z</updated>
  <author><name>mfp0001.example.org</name></author>
  <id>urn:uuid:bfd13eb3-a03c-4431-b627-d0a9ece0efa3</id>
  <entry>
    <id>urn:uuid:f85e59d7-4a14-4d63-9d3f-85a986b67e6f</id>
    <title>REGULAR CONFERENCE-2007-10-04-RECORD</title>
    <updated>2007-10-05T 10:10:20Z</updated>
    <content>REGULAR CONFERENCE RECORD</content>
    <link rel="enclosure" title="PDF FORMAT JAPANESE"
          type="application/vnd.ms-xpsdocument" hreflang="ja"
          href="http:// mfp0001.example.org/publicfolder1/200710040001.pdf"/>
    <link rel="enclosure" title="XPS FORMAT JAPANESE DIGITAL SIGNATURE = ON"
          type="application/vnd.ms-xpsdocument" hreflang="ja"
          href="http:// mfp0001.example.org/publicfolder1/200710040001.xps"/>
  </entry>
</feed>
```

F I G. 7

```xml
<?xml version="1.0" encoding="utf-8"?>
<feed xmlns="http:// www.w3.org/2005/Atom">
   <title>XXX GROUP SHARED FOLDER</title>
   <link rel="self" href="http:// mfp0001.example.org/publicfolder1/feed/atom.xml"/>
   <updated>2007-10-11T 12:10:00Z</updated>
   <author><name>mfp0001.example.org</name></author>
   <id>urn:uuid:bfd13eb3-a03c-4431-b627-d0a9ece0efa3</id>
  <entry>
    <id>urn:uuid:f85e59d7-4a14-4d63-9d3f-85a986b67e6f</id>
    <title>>REGULAR CONFERENCE-2007-10-04-RECORD</title>
    <updated>2007-10-04T 12:50:40Z</updated>
    <content>REGULAR CONFERENCE RECORD</content>
    <link rel="enclosure" title="PDF FORMAT JAPANESE"
        type="application/pdf" hreflang="ja"
        href="http:// mfp0001.example.org/publicfolder1/200710040001.pdf"/>
    <link rel="enclosure" title="PDF FORMAT ENGLISH"
        type="application/pdf" hreflang="en-us"
        href="http:// mfp0001.example.org/publicfolder1/200710040002.pdf"/>
    <link rel="enclosure" title="XPS FORMAT JAPANESE DIGITAL SIGNATURE = ON"
        type="application/vnd.ms-xpsdocument" hreflang="ja"
        href="http:// mfp0001.example.org/publicfolder1/200710040001.xps"/>
  </entry>
  <entry>
    <id>urn:uuid:f8d22f7f-6bc8-4abb-9a6b-801f80e1ef41</id>
    <title>REGULAR CONFERENCE-2007-10-04-ASSIGNMENT</title>
    <updated>2007-10-06T 12:10:00Z</updated>
    <content>REQUIRED RESEARCH ITEM</content>
    <link rel="enclosure" title="PDF FORMAT JAPANESE"
        type="application/pdf" hreflang="ja"
        href="http:// mfp0001.example.org/publicfolder1/200710060001.pdf"/>
    <link rel="enclosure" title="PDF FORMAT ENGLISH"
        type="application/pdf" hreflang="en-us"
        href="http:// mfp0001.example.org/publicfolder1/200710060002.pdf"/>
    <link rel="enclosure" title="XPS FORMAT JAPANESE DIGITAL SIGNATURE = ON"
        type="application/vnd.ms-xpsdocument" hreflang="ja"
        href="http:// mfp0001.example.org/publicfolder1/200710060001.xps"/>
  </entry>
</feed>
```

FIG. 8A

| DOCUMENT NAME (601) | STORAGE DESTINATION PUBLIC FOLDER (602) | EXPLANATORY TEXT OF DOCUMENT (603) | DOCUMENT FORMAT (604) | GENERATION OPTION (605) |
|---|---|---|---|---|
| REGULAR CONFERENCE 2007-10-04-RECORD | PUBLIC FOLDER FOR XXX GROUP MEMBER | REGULAR CONFERENCE RECORD | XPS FORMAT | PUBLISHED AS JAPANESE DOCUMENT, DIGITAL SIGNATURE =ON |

FIG. 8B

| DOCUMENT NAME (611) | STORAGE DESTINATION PUBLIC FOLDER (612) | EXPLANATORY TEXT OF DOCUMENT (613) | DOCUMENT FORMAT (614) | GENERATION OPTION (615) |
|---|---|---|---|---|
| REGULAR CONFERENCE 2007-10-04-RECORD | PUBLIC FOLDER FOR XXX GROUP MEMBER | - | PDF FORMAT | PUBLISHED AS JAPANESE DOCUMENT |

FIG. 8C

| GENERATION OPTION NAME (701) | DOCUMENT PROPERTY SETTING DESTINATION NODE (702) | DOCUMENT PROPERTY SETTING METHOD (703) | DOCUMENT PROPERTY SETTING VALUE (704) |
|---|---|---|---|
| PUBLISHED AS JAPANESE DOCUMENT | link/@title | ADD | JAPANESE |
| | link/@hreflang | UPDATE | ja |
| PUBLISHED AS ENGLISH DOCUMENT | link/@title | ADD | ENGLISH |
| | link/@hreflang | UPDATE | en-us |
| DIGITAL SIGNATURE=ON | link/@title | ADD | DIGITAL SIGNATURE=ON |

FIG. 9A

| FOLDER NAME | FOLDER PATH | FEED DATA FORMAT | FEED DATA PATH |
|---|---|---|---|
| XXX GROUP SHARED FOLDER | / publicfolder1 | application / atom+xml | / publicfolder1 / feed / atom.xml |
| YYY GROUP SHARED FOLDER | / publicfolder2 | application / atom+xml | / publicfolder2 / feed / atom.xml |
| ... | ... | ... | ... |

| FOLDER NAME | FOLDER PATH | FEED DATA FORMAT | DIGITAL DOCUMENT GENERATION APPARATUS (MAIN) NAME | FEED DATA PATH |
|---|---|---|---|---|
| XXX GROUP SHARED FOLDER | / publicfolder1 | application / atom+xml | mfp0001.example.com | / publicfolder1 / feed / atom.xml |
| YYY GROUP SHARED FOLDER | / publicfolder2 | application / atom+xml | mfp0001.example.com | / publicfolder2 / feed / atom.xml |
| ... | ... | ... | ... | ... |

1601, 1602, 1603, 1604, 1605

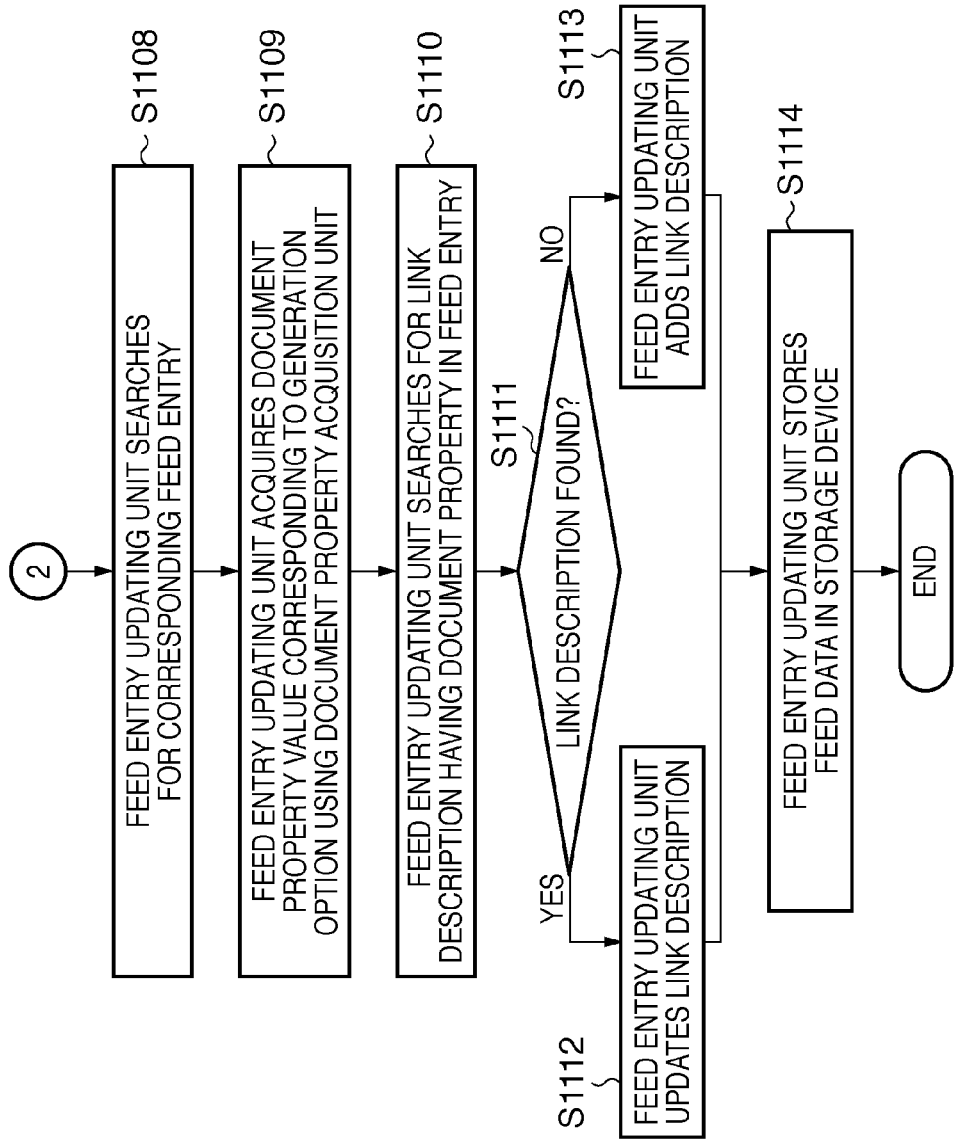

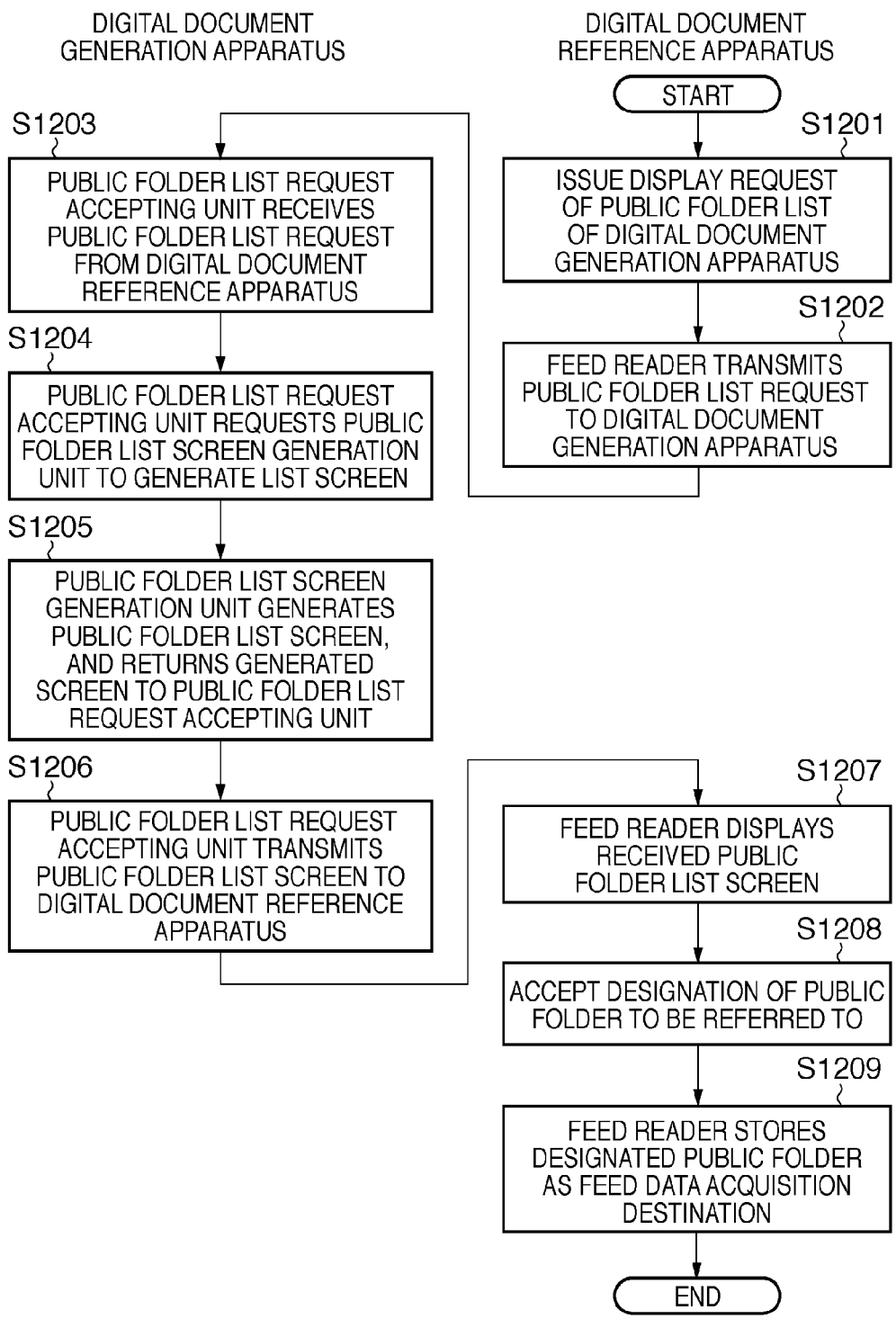

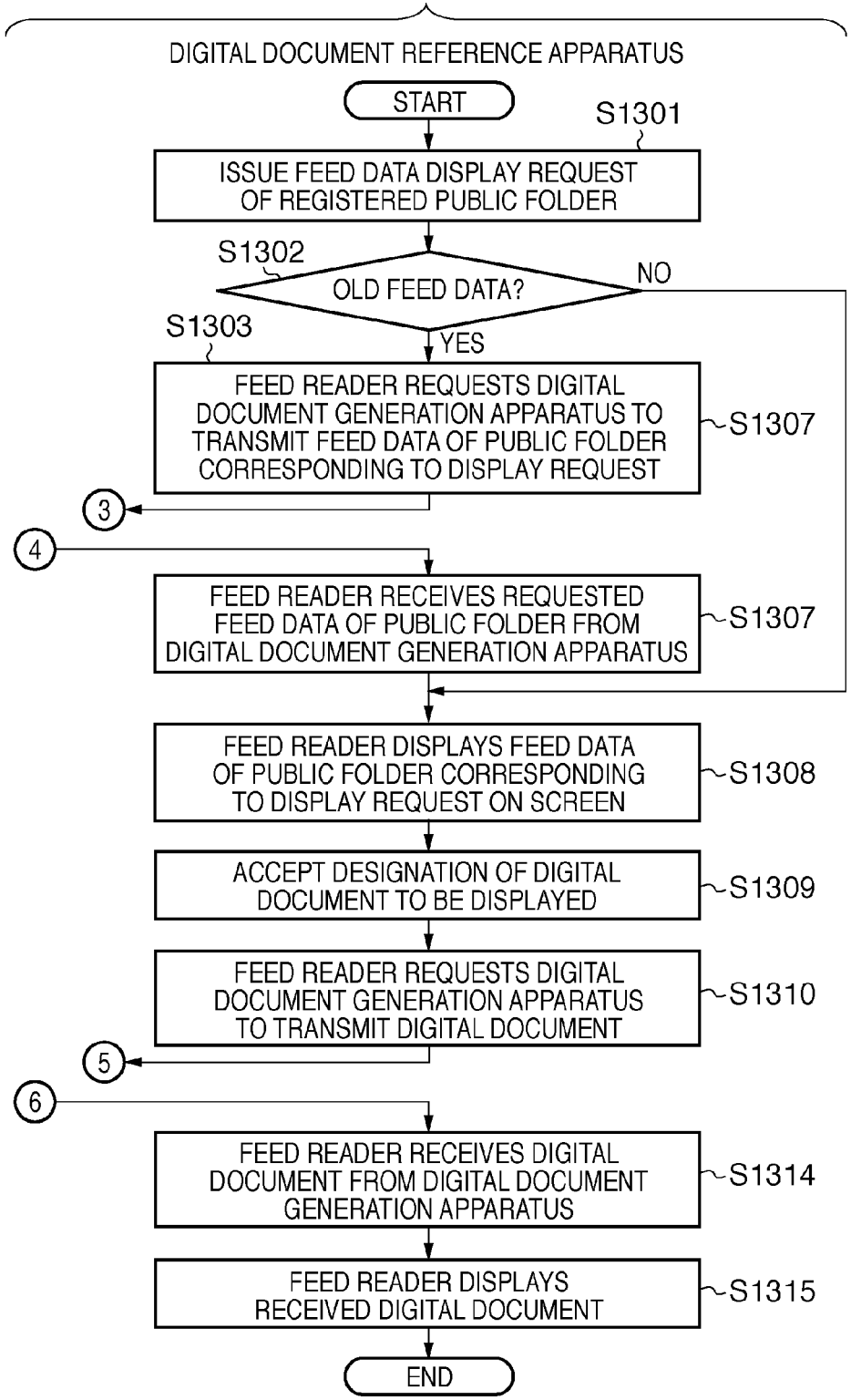

F I G. 16
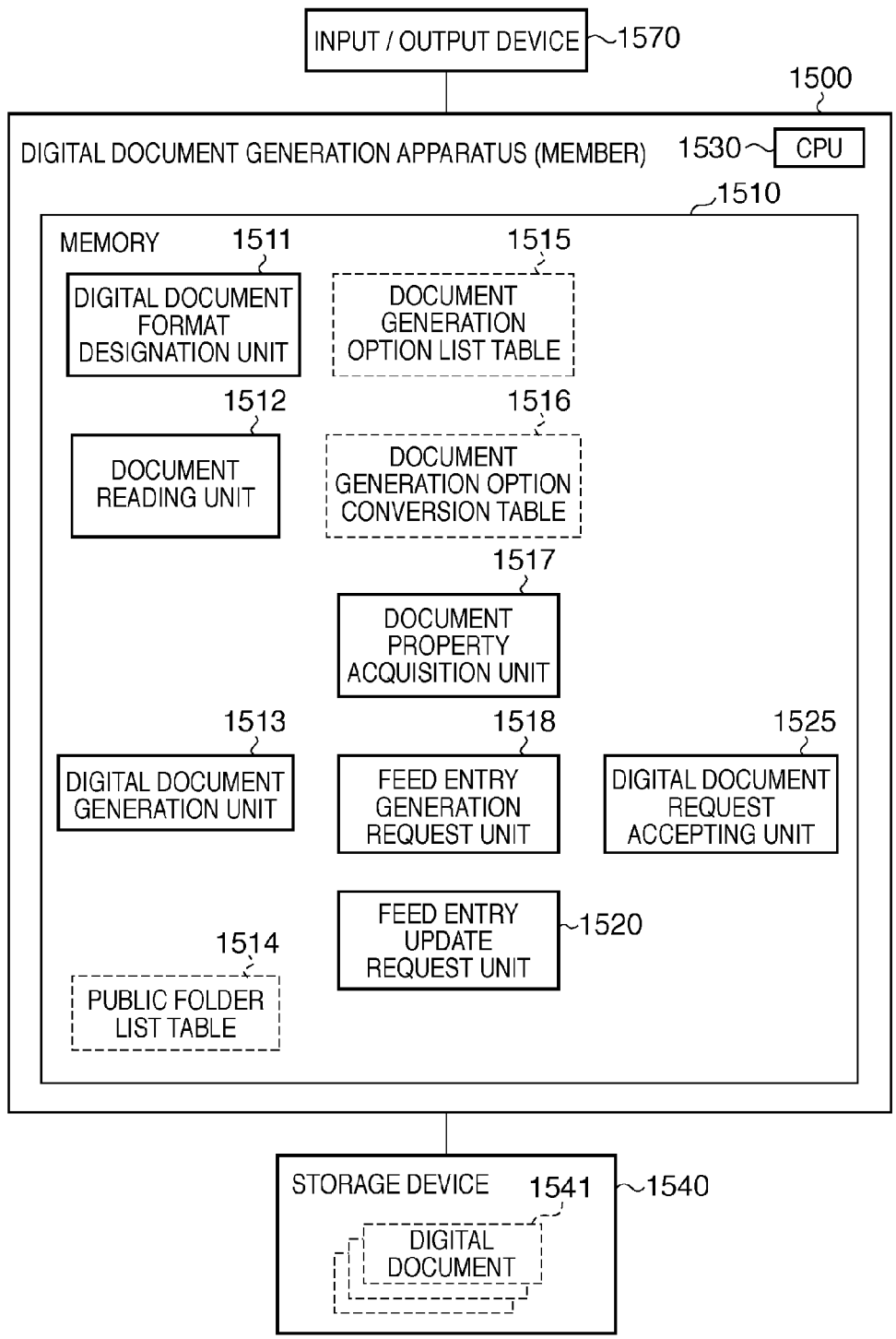

IMAGE PROCESSING APPARATUS AND IMAGE PROCESSING METHOD

BACKGROUND OF THE INVENTION

1. Field of the Invention

The present invention relates to a technique for sharing digital documents between apparatuses which can make data communications via a network.

2. Description of the Related Art

Conventionally, a technique for reading a paper document using a scanner function, generating a digital document in a PDF format of Adobe® Systems or an XPS format of Microsoft® Corporation, and then storing the digital document in a specific storage area (folder) is known. Also, a technique in which an apparatus having a scanner function notifies a destination acquired from a folder setting or document information that a document is stored via an e-mail message is known (see Japanese Patent Laid-Open No. 2005-346501).

As in the conventional technique, when a digital document generation apparatus having a scan function notifies, using an e-mail message, a digital document reference side that a generated digital document is stored in a folder, an e-mail message is transmitted to an apparatus set as a destination every time a document is added or updated in the folder. As a result, an apparatus on the reference side which need not frequently confirm updating of digital documents and that on the reference side which requires only latest update information of digital documents are unwantedly frequently notified of update information of digital documents. When a plurality of e-mail destinations are set, the loads on mail transmission processing of apparatuses or a network are concentrated in a certain period.

SUMMARY OF THE INVENTION

The present invention has been made in consideration of the aforementioned problems, and provides a technique which allows an apparatus which need not frequently confirm updating of digital documents and an apparatus which requires only latest update information of digital documents to refer to update information using feed readers at a desired frequency.

According to one aspect of the present invention, there is provided an image processing apparatus comprising: a unit that generates a digital document based on document content information obtained by reading a paper document, and instruction content information for document generation; a unit that generates explanatory information of the paper document based on the instruction content information; a unit that generates feed data as data used to notify an external apparatus of generation of the digital document with reference to the explanatory information; and a unit that transmits the feed data to the external apparatus in response to a request from the external apparatus.

According to another aspect of the present invention, there is provided an image processing method comprising: a step of generating a digital document based on document content information obtained by reading a paper document, and instruction content information for document generation; a step of generating explanatory information of the paper document based on the instruction content information; a step of generating feed data as data used to notify an external apparatus of generation of the digital document with reference to the explanatory information; and a step of transmitting the feed data to the external apparatus in response to a request from the external apparatus.

Further features of the present invention will become apparent from the following description of exemplary embodiments with reference to the attached drawings.

BRIEF DESCRIPTION OF THE DRAWINGS

FIG. 3A is a view showing screen data, and

FIG. 3B is a view showing a display example of a screen;

FIG. 4 is a view showing a display example of a screen;

FIGS. 5A and 5B are views showing an example of feed data 142;

FIGS. 6A and 6B are views showing an example of the feed data 142;

FIG. 7 is a view showing an example of the feed data 142;

FIGS. 8A and 8B show examples of the configurations of a document generation option list table 115, and FIG. 8C shows an example of the configuration of a document generation option conversion table 116;

FIG. 9A shows an example of the configuration of a public folder list table 114, and FIG. 9B shows an example of the configuration of a public folder list table 1514;

FIGS. 12A and 12B are flowcharts each showing details of a process in step S907;

FIG. 13 is a flowchart of feed data reference registration processing;

FIGS. 14A and 14B are flowcharts each of feed data acquisition processing;

FIG. 16 is a block diagram showing an example of the hardware arrangement of a digital document generation apparatus 1500.

DESCRIPTION OF THE EMBODIMENTS

Embodiments of the present invention will be described hereinafter with reference to the accompanying drawings. Note that embodiments to be explained hereinafter show examples upon practicing the present invention, and are those of practical embodiments of the arrangements described in the scope of claims.

First Embodiment

Figure 1:
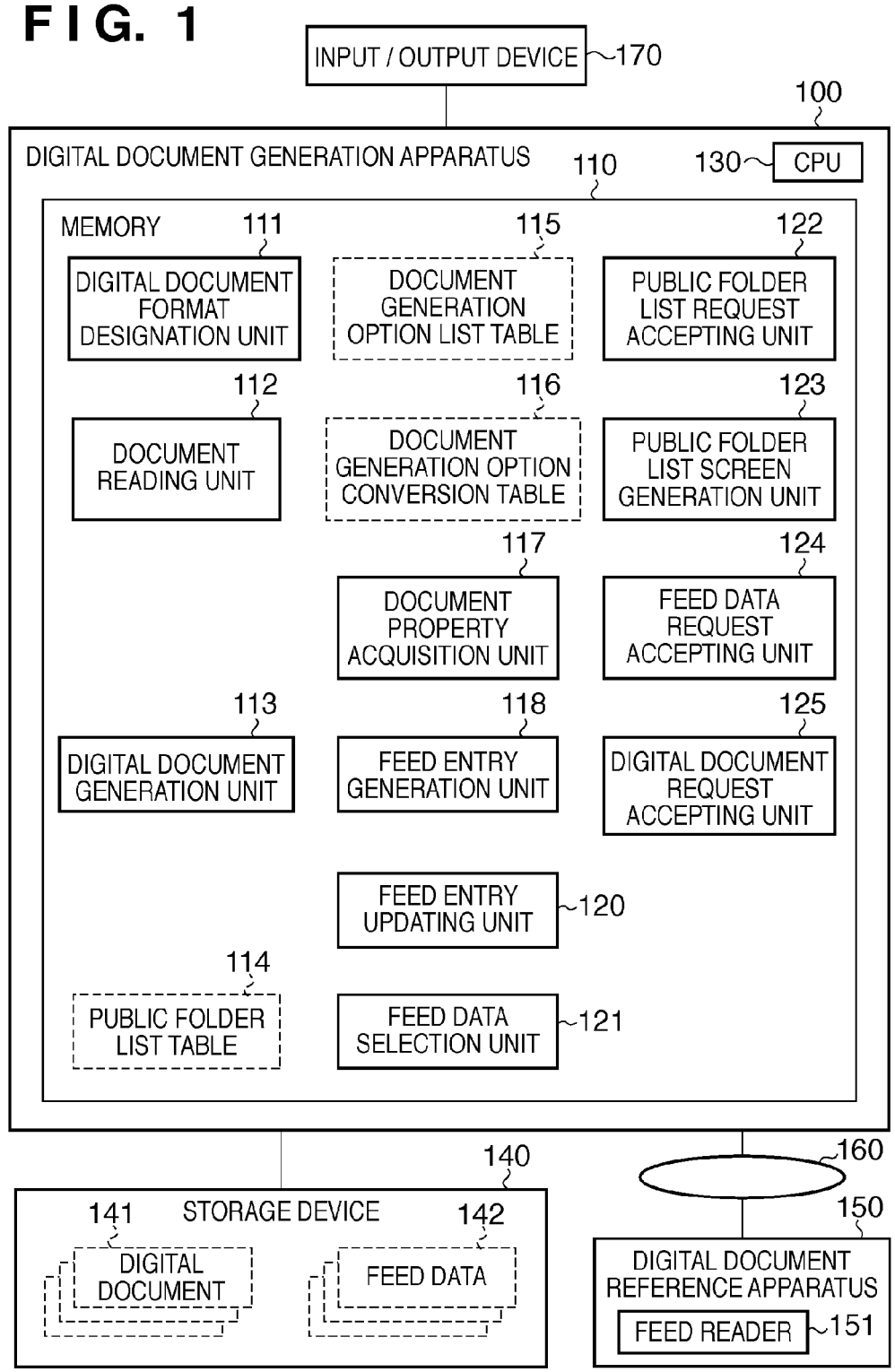
FIG. 1 is a block diagram showing an example of the hardware arrangement of a digital document generation apparatus.

FIG. 1 is a block diagram showing an example of the hardware arrangement of a digital document generation apparatus as an image processing apparatus according to this embodiment. As shown in FIG. 1, a digital document generation apparatus 100 includes a memory 110 and CPU 130. Furthermore, to this digital document generation apparatus 100, a storage device 140 and input/output device 170 are connected. Moreover, the digital document generation apparatus 100 is connected to a network 160, to which a digital document reference apparatus 150 (external apparatus) used to refer to digital documents generated by the digital document generation apparatus 100 is connected.

The input/output device 170 includes a display screen of a touch panel type, a keyboard, and a mouse. Upon operation by the user, the input/output device 170 can input various instructions to the CPU 130, and can make various displays.

The storage device 140 stores digital documents 141 generated by the digital document generation apparatus 100, and feed data 142 used to notify the digital document reference apparatus 150 of updating of these digital documents 141. Of course, this storage device 140 may store information required in processes to be described later. In this embodiment, this storage device 140 includes a hard disk drive, but it may include other kinds of storage devices such as a CD-ROM and DVD-ROM.

The digital document reference apparatus 150 stores a feed reader 151 as a Web browser that can display data described in HTML. This feed reader 151 is executed by a CPU (not shown) included in the digital document reference apparatus 150. Of course, other kinds of viewers may be used as long as the same object can be achieved. The memory 110 stores respective units to be listed below in the form of computer programs:

a digital document format designation unit 111;
a document reading unit 112;
a digital document generation unit 113;
a document property acquisition unit 117;
a feed entry generation unit 118;
a feed entry updating unit 120;
a feed data selection unit 121;
a public folder list request accepting unit 122;
a public folder list screen generation unit 123;
a feed data request accepting unit 124; and
a digital document request accepting unit 125.

Furthermore, the memory 110 stores respective units to be listed below in the form of data:

a public folder list table 114;
a document generation option list table 115; and
a document generation option conversion table 116.

The digital document format designation unit 111 makes various settings about a digital document which is acquired from a paper document by the digital document generation apparatus 100. The document generation option list table 115 is used to register setting information set by the digital document format designation unit 111.

The document reading unit 112 acquires information recorded on a paper document set on the digital document generation apparatus 100 as an image, and outputs the acquired image to the digital document generation unit 113 to request it to generate a digital document.

The digital document generation unit 113 generates a digital document based on the image acquired by the document reading unit 112, and stores the generated digital document in the storage device 140 as a digital document 141. The public folder list table 114 describes correspondence relationship information between public folder names published to the digital document reference apparatus 150 and folder paths on the storage device 140.

The document property acquisition unit 117 acquires document properties used in feed data from document generation options. The document generation option conversion table 116 describes correspondence relationship information between document generation options and document properties used in feed data.

The feed entry generation unit 118 creates new entry data, and additionally registers the created new entry data in feed data 142 already stored in the storage device 140. The feed entry updating unit 120 updates the entry data in the feed data 142 registered in the storage device 140. The feed data selection unit 121 selects and acquires required feed data from the feed data 142 already stored in the storage device 140.

The public folder list request accepting unit 122 accepts a public folder list request from the digital document reference apparatus 150, and transmits screen data required to display a public folder list to the digital document reference apparatus 150.

The public folder list screen generation unit 123 generates screen data required to display the public folder list. The feed data request accepting unit 124 accepts a feed data request from the digital document reference apparatus 150, and transmits feed data corresponding to this request to the digital document reference apparatus 150. The digital document request accepting unit 125 accepts a digital document request from the digital document reference apparatus 150, and transmits a digital document corresponding to this request to the digital document reference apparatus 150.

Note that the aforementioned units described as those stored in the memory 110 implement their functions when they are executed by the CPU 130. In the following description, the respective units stored in the memory 110 serve as main bodies of processes for the sake of descriptive convenience. However, in practice, the CPU 130 serves as a main body of the processes.

Figure 2:
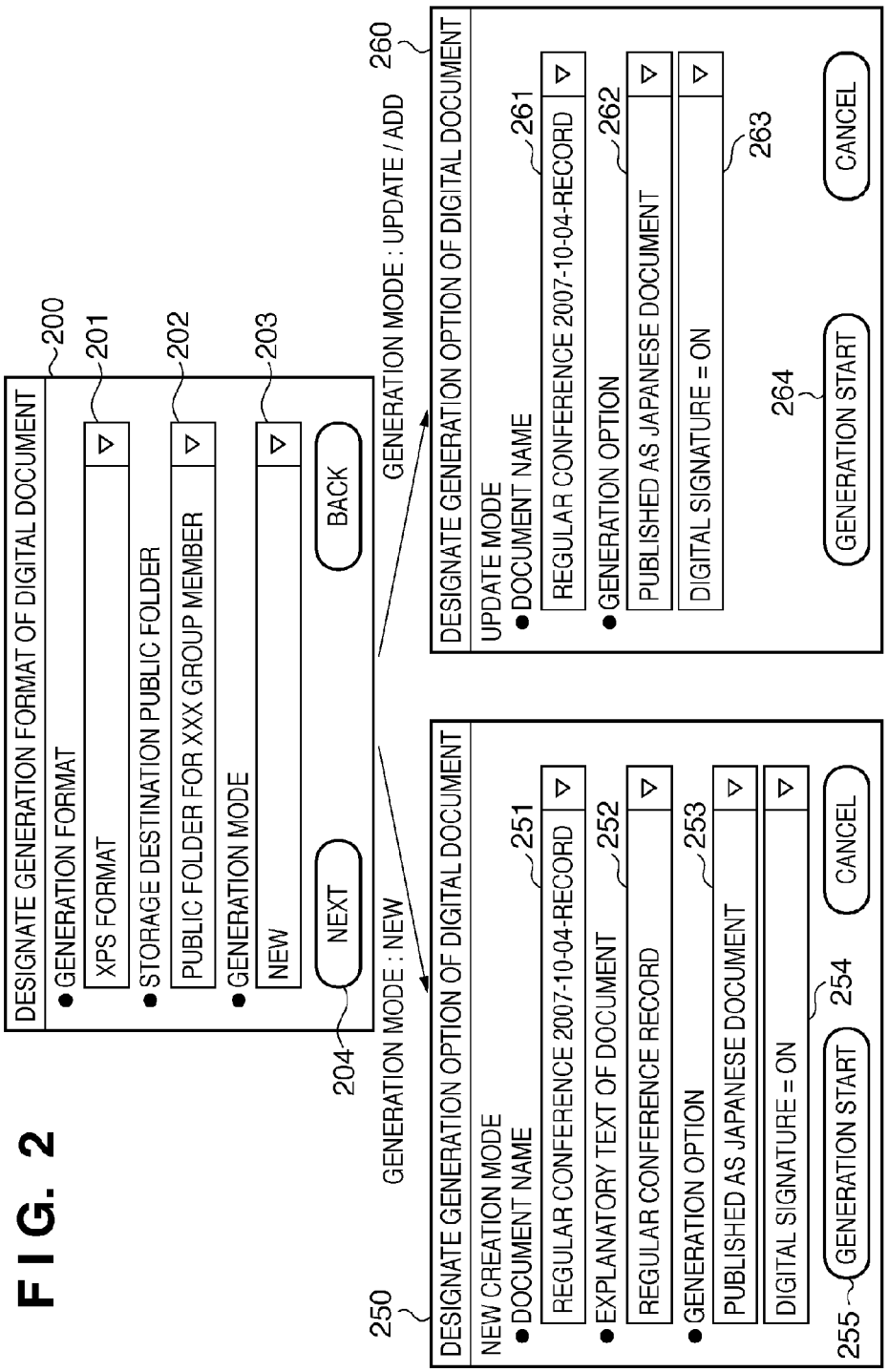
FIG. 2 is a view showing a transition example of screens.

Screens which will appear in respective processes to be described below will be briefly explained. FIG. 2 is a view showing a transition example of screens used to designate a generation format and generation options of a digital document prior to generation of the digital document by the digital document generation apparatus 100. An upper screen in FIG. 2 corresponds to an initial screen. When the user selects a generation mode new on this initial screen, the initial screen transits to a lower left screen shown in FIG. 2. When the user selects a generation mode "update/add" on the initial screen, the initial screen transits to a lower right screen shown in FIG. 2.

FIG. 3A shows screen data generated by the public folder list screen generation unit 123, and FIG. 3B shows a display example of a screen displayed based on this screen data. FIG. 3A shows a case in which the screen data is described in an HTML format. The screen shown in FIG. 3B is displayed by the feed reader 151 included in the digital document reference apparatus 150.

FIG. 4 shows a display example of a screen displayed by the feed reader 151 included in the digital document reference apparatus 150 based on the feed data 142 in the storage device 140. FIGS. 5A and 5B, FIGS. 6A and 6B, and FIG. 7 show an example of the feed data 142 in the storage device 140, which is described using the ATOM Syndication Format as a feed format published by the IETF as an RFC.

In this description example, a public folder (storage folder) named "XXX group shared folder" includes two entries "regular conference 2007-10-04-record" and "regular conference 2007-10-04-assignment". Also, the example describes that three digital documents having different document formats and languages are available for each entry. Note that the description format of the feed data may use other feed formats such as RSS (Really Simple Syndication) as a de facto standard.

FIGS. 8A and 8B show examples of the configurations of the document generation option list table 115. In FIG. 8A, the document generation option list table 115 is configured by fields 601 to 605. In the field 601, a document name of a digital document is registered. In the field 602, a name of a public folder used to store the digital document is registered.

In the field 603, explanatory text of the digital document is registered. In the field 604, the format of the digital document is registered. In the field 605, options designated at the time of generation of the digital document are registered.

In FIG. 8B, the document generation option list table 115 is configured by fields 611 to 615. The properties of the respective fields are the same as the fields 601 to 605 shown in FIG. 8A.

FIG. 8C shows an example of the configuration of the document generation option conversion table 116. The document generation option conversion table 116 is configured by fields 701 to 704. In the field 701, a name of a generation option designated at the time of generation of a digital document is registered. In the field 702, a node name (document property setting destination node name) of an element or attribute in the feed data 142 that requires to set a document property upon designation of the name of the generation option is registered. In the field 703, a method upon setting the document property in the node designated by the document property setting destination node name is registered. In the field 704, a document property setting value is registered. Note that XPath expression data whose specifications are designed by the W3C is registered in the field 702. However, data of any other formats may be registered as long as they can specify an element or attribute in a feed entry.

FIG. 9A shows an example of the configuration of the public folder list table 114. The public folder list table 114 is configured by fields 801 to 804. In the field 801, a name of a public folder is registered. In the field 802, a path of the public folder (folder path) in the storage device 140 is registered. In the field 803, the format of feed data of the public folder is registered. In the field 804, a path of the feed data (feed data path) of the public folder in the storage device 140 is registered. Assume that each public folder has been generated before generation of a digital document, and the public folder list table 114 has already been created in this embodiment. Alternatively, each public folder and the public folder list table 114 may be created during generation of a digital document.

Figure 10:
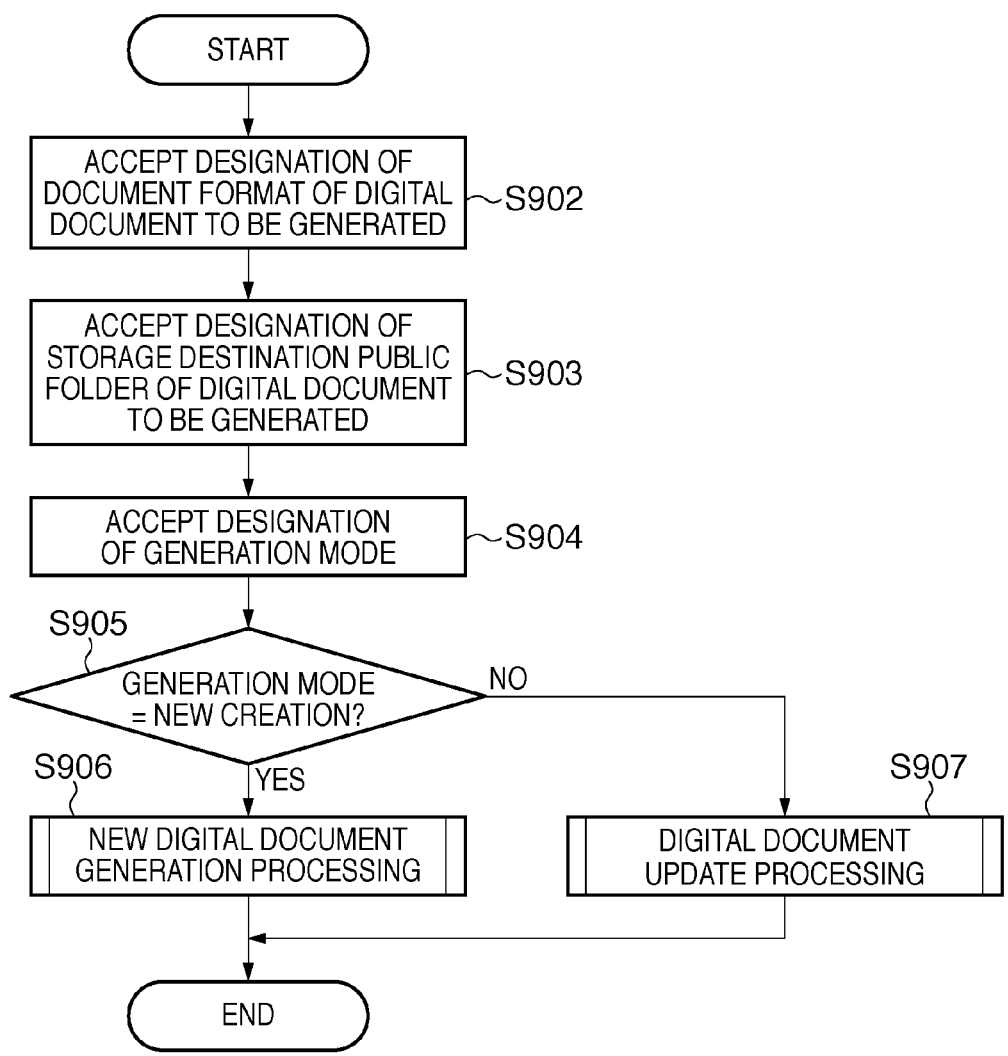
FIG. 10 is a flowchart of digital document generation processing by a digital document generation apparatus 100.

The digital document generation processing by the digital document generation apparatus 100 will be described below with reference to FIG. 10 that shows the flowchart of this processing. The user of the digital document generation apparatus 100 sets a paper document to be read on the digital document generation apparatus 100. At this time, the screen exemplified as the upper screen in FIG. 2 is displayed on the touch panel type screen of the input/output device 170. The user designates a document format, storage destination public folder, and generation mode of a digital document generated based on this paper document by operating the input/output device 170.

A menu 201 allows the user to select one of a plurality of types of document formats such as a PDF format of Adobe Systems and an XPS format of Microsoft Corporation that the digital document generation apparatus 100 can generate. The user selects one document format of the digital document to be generated by operating the input/output device 170.

A menu 202 allows the user to select one of a plurality of public folders created in advance. The user selects one public folder to be used by operating the input/output device 170. Note that the present invention is not limited to use of a public folder which is created in advance, and a new folder may be created at this time.

A menu 203 allows the user to select one of generation modes. The generation modes include creation of a new digital document ("new" mode), creation of a digital document of a new version of the digital document already stored in the public folder ("update" mode), and creation of a digital document of a format different from the digital document already stored in the public folder ("add" mode).

Therefore, when the user selects the generation format by operating the menu 201 using the input/output device 170, the digital document format designation unit 111 acquires information indicating the selected generation format in step S902.

When the user selects the storage destination public folder by operating the menu 202 using the input/output device 170, the digital document format designation unit 111 acquires information indicating this selected storage destination public folder in step S903.

When the user selects the generation mode by operating the menu 203 using the input/output device 170, the digital document format designation unit 111 acquires information indicating this selected generation mode in step S904.

If the generation mode indicated by the information acquired in step S904 is "new", the process advances to step S906 via step S905; if the generation mode is other than "new", the process advances to step S907 via step S905. Details of the processes in steps S906 and S907 will be described later.

In steps S902 to S904, the results of user's operations using the input/output device 170 are acquired. However, results which are designated by an application program that runs on the digital document generation apparatus 100 in the form of procedure calls such as function calls of C may be acquired in steps S902 to S904.

Figure 11A:
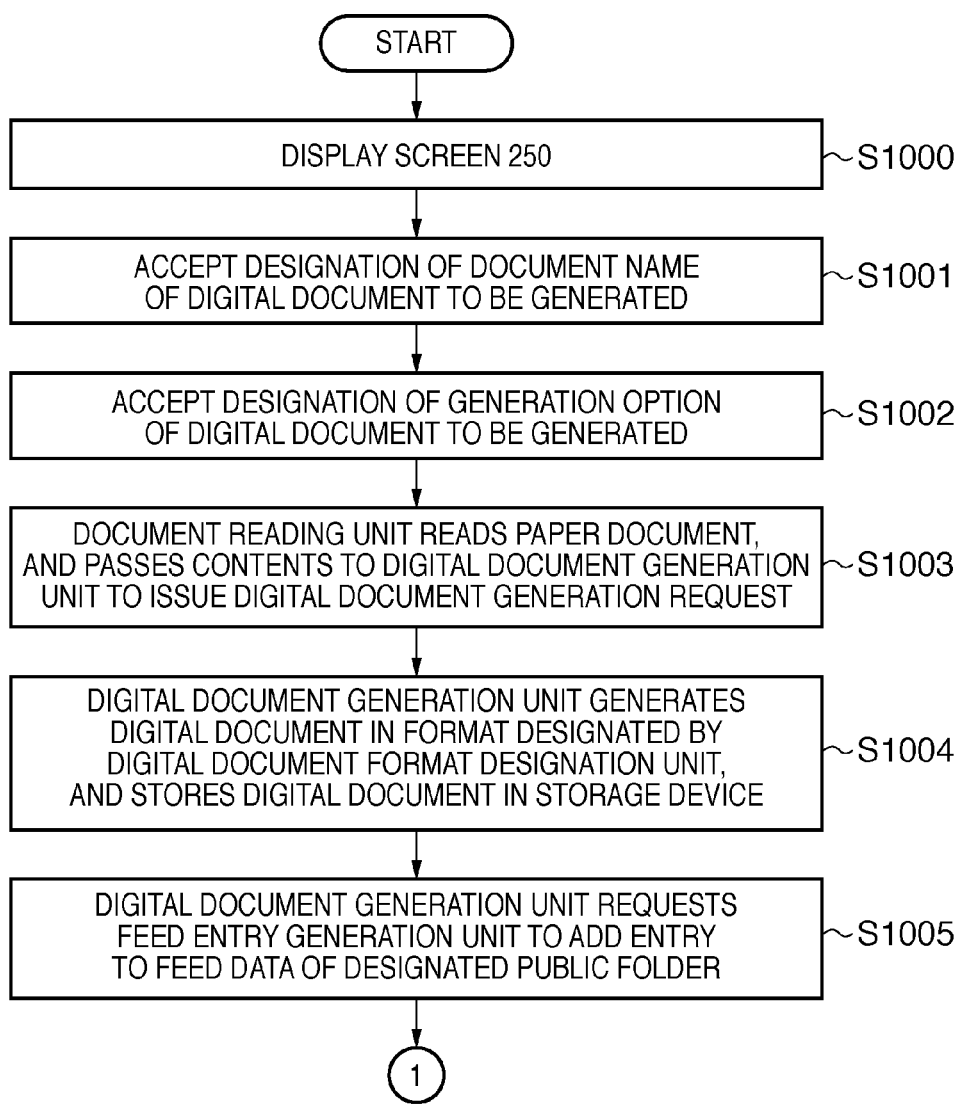
FIGS. 11A and 11B are flowcharts each showing details of a process in step S906.
Figure 11B:
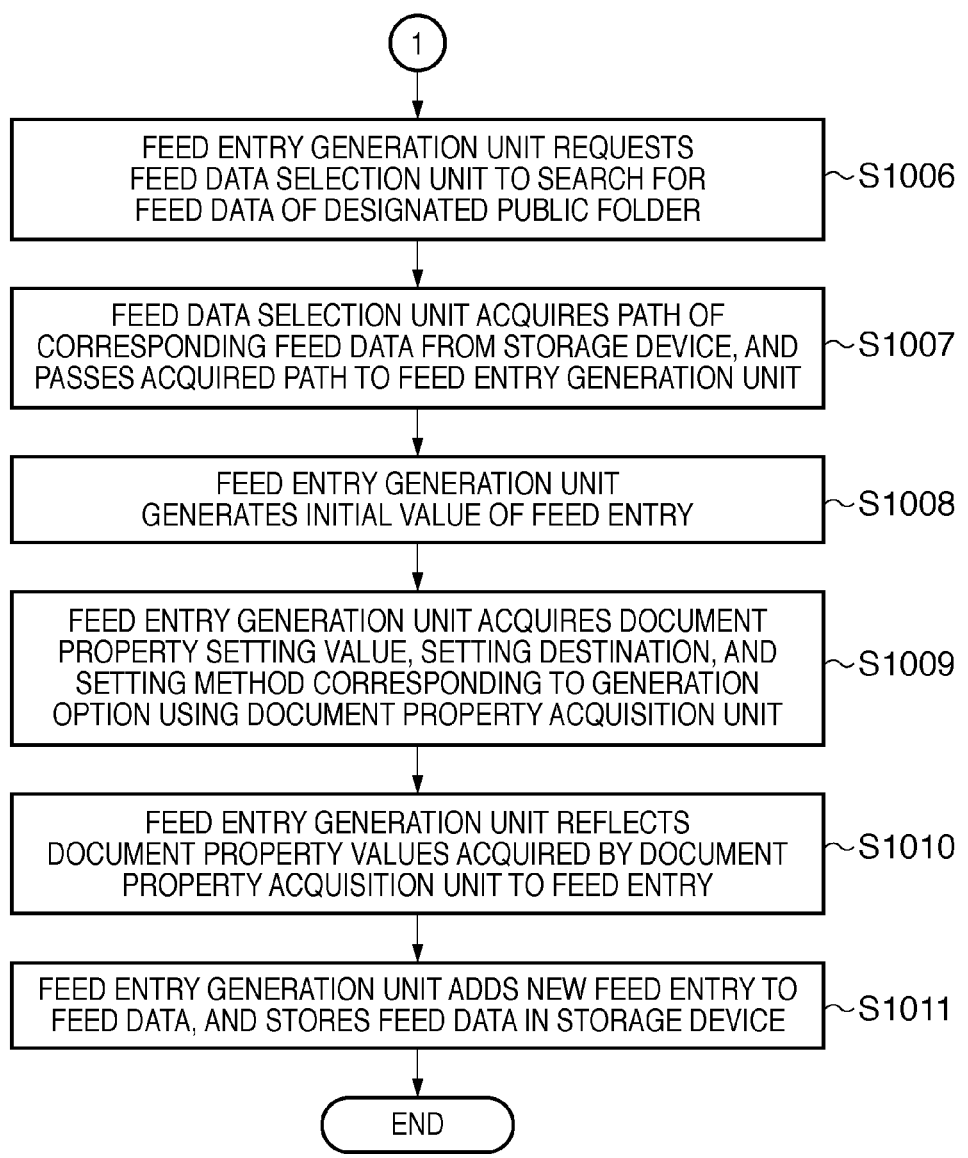

Details of the process in step S906 will be described below with reference to FIGS. 11A and 11B. FIGS. 11A and 11B are flowcharts each showing details of the process in step S906. When the user selects new by operating the menu 203 on a screen 200 using the input/output device 170, and then clicks a "next" button 204, the input/output device 170 displays a screen 250 on the self touch panel in step S1000.

Since the user inputs a document name in a field 251 using the input/output device 170, the digital document format designation unit 111 acquires this input document name in step S1001. A character string designated as the document name is an arbitrary character string which is not used as a digital document name yet.

Since the user inputs explanatory text of the document in a field 252 using the input/output device 170, the digital document format designation unit 111 acquires this input explanatory text of the document in step S1002. A character string designated as the explanatory text of the document is explanatory text associated with the contents of this digital document, and is an arbitrary character string.

Since the user selects generation options by operating menus 253 and 254 using the input/output device 170, the digital document format designation unit 111 further acquires these selected generation options in step S1002. The generation options include parameters to be designated when the digital document generation apparatus 100 generates a digital document. This embodiment adopts, as generation options, a language type (selectable by the menu 253) upon publishing a digital document, and ON/OFF of a digital signature (selectable by the menu 254). However, different generation parameters may be used depending on the functions of the digital document generation apparatus 100.

When the user clicks a "generation start" button 255 using the input/output device 170, the process in step S1003 is started. In step S1003, the digital document format designation unit 111 registers the data acquired in steps S1001 and S1002 in the document generation option list table 115, and then issues a read instruction to the document reading unit 112. Upon reception of this read instruction, the document reading unit 112 reads the set paper document, and acquires information described on this paper document as an image. The document reading unit 112 outputs the image acquired by reading to the subsequent digital document generation unit 113, and requests it to generate a digital document.

In step S1004, the digital document generation unit 113, which received the digital document generation request, acquires the setting contents acquired by the digital document format designation unit 111 from the document generation option list table 115, and generates a digital document based on the acquired setting contents. After that, the digital document generation unit 113 acquires a folder path (field 802) using the designated public folder name (field 801) as a search key from the public folder list table 114. Then, the digital document generation unit 113 stores, as a file, the generated digital document in a corresponding folder in the storage device 140 based on the acquired folder path.

In step S1005, the digital document generation unit 113 requests the feed entry generation unit 118 to add an entry corresponding to the generated digital document to feed data of the public folder together with the path name (200710040001.xps) of the stored file.

In step S1006, the feed entry generation unit 118, which received this entry addition request, requests the feed data selection unit 121 to search for feed data of the designated public folder.

In step S1007, the feed data selection unit 121, which received this search request, searches for a feed data format (field 803) and feed data path (field 804) using the public folder name as a search key with reference to the public folder list table 114. Then, the feed data selection unit 121 passes the search results to the feed entry generation unit 118. When no digital document is stored in the public folder since that folder is generated, feed data does not include any entry element corresponding to a feed entry, as shown in FIG. 5A.

In step S1008, the feed entry generation unit 118 sets initial values in an entry element corresponding to a feed entry to be added with reference to the document generation option list table 115. For example, when values are set in the document generation option list table 115, as shown in FIG. 8A, the feed entry generation unit 118 sets the following initial values in the entry element.

<id attribute of entry element>
a generated unique value (UUID whose specification is specified by RFC4122 of the IETF in the description of embodiment is used)
<title attribute of entry element>
a value of the document name (field 601) ("regular conference 2007-10-04-record")
<update attribute of entry element>
a feed entry generation time
<content attribute of entry element>
a value of the explanatory text of document (field 603) ("regular conference record")
<value of title attribute of link child element of entry element>
a value of the document format (field 604) ("XPS format")<
value of type attribute of link child element of entry element>
a MIME type corresponding to the value of document format (field 604) ("application/vnd.ms-xpsdocument")

After the above settings, in step S1009 the feed entry generation unit 118 requests the document property acquisition unit 117 to acquire document property setting values, setting destination nodes, and setting methods corresponding to the generation options (field 605) of the digital document. The document property acquisition unit 117 outputs the document property setting values, setting destination nodes, and setting methods to the feed entry generation unit 118 with reference to the document generation option conversion table 116.

For example, when values are set in the document generation option conversion table 116, as shown in FIG. 8C, the document property acquisition unit 117 outputs the following values to the feed entry generation unit 118.

generation option: published as Japanese document
document property setting destination node: link/@title
document property setting method: add
document property setting value: Japanese
document property setting destination node: link/@hreflang
document property setting method: update
document property setting value: ja
generation option: digital signature=ON
document property setting destination node: link/@title
document property setting method: add
document property setting value: digital signature=ON In step S1010, the feed entry generation unit 118 operates as follows. Initially, the feed entry generation unit 118 sets "Japanese" and "digital signature=ON" in the initial value "XPS format" of the title attribute of the link child element of the entry element indicated by "document property setting destination node" as addition of values according to "document property setting method". Furthermore, the feed entry generation unit 118 sets "ja" in the hreflang attribute of the link child element of the entry element indicated by "document property setting destination node" as update of a value, as designated by "document property setting method". In this embodiment, the values are set in the title and hreflang attributes of the link element. Also, values may be set in other nodes that the feed reader can interpret.

After the values acquired by the document property acquisition unit 117 are reflected to the feed entry, the feed entry generation unit 118 executes a process in step S1011. In step S1011, the feed entry generation unit 118 sets a value of an update date and time (an update attribute of the entry element) of the feed entry in an update date and time (an update attribute of a feed element) of feed data, and stores the value in the storage device 140. Note that FIG. 5B shows an example of feed data to be stored in the storage device 140 when a new digital document is created.

Figure 12A:
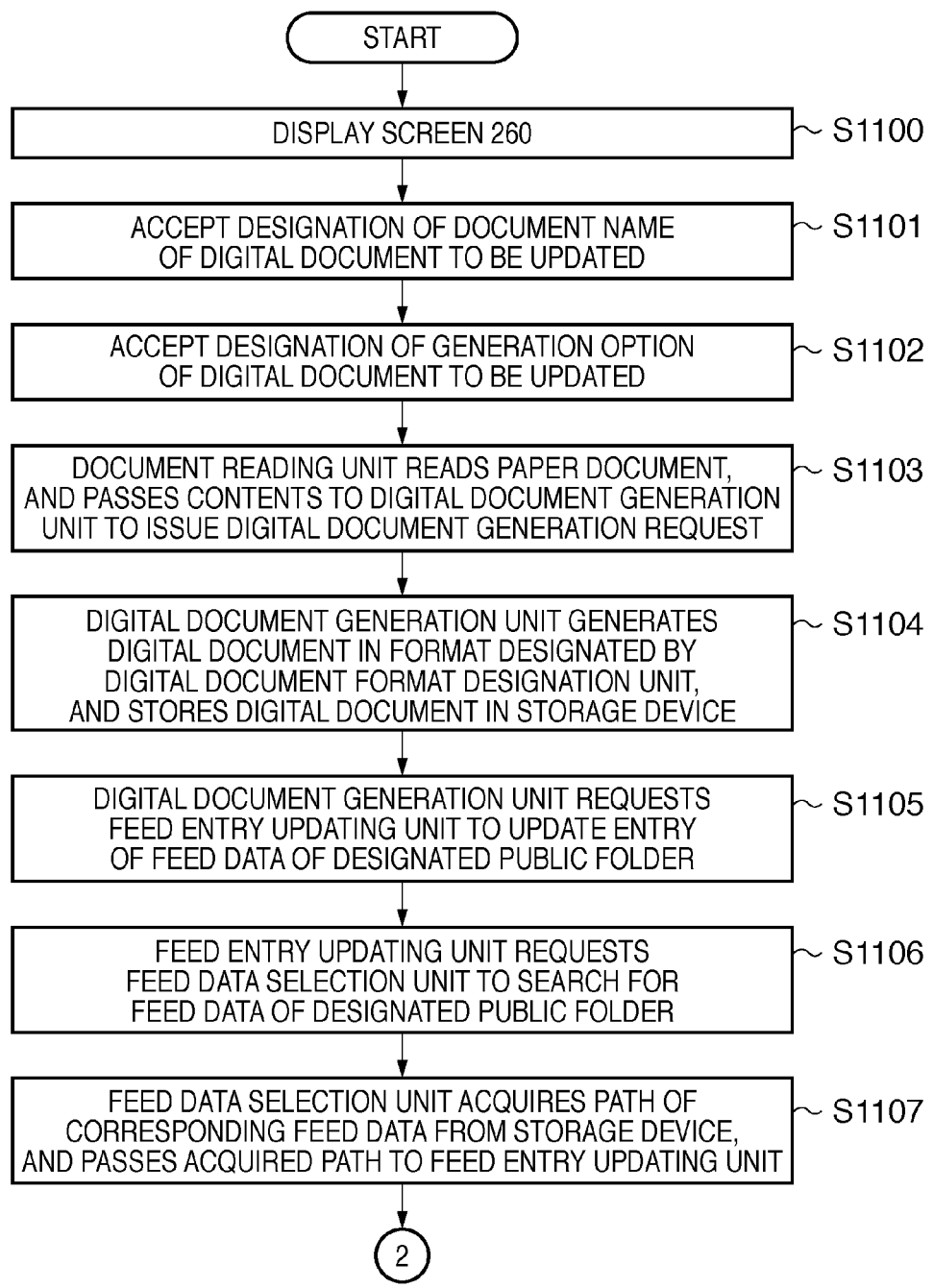

Details of the process in step S907 will be described below with reference to FIGS. 12A and 12B. FIGS. 12A and 12B are flowcharts each showing details of the process in step S907. When the user selects "update" or "add" by operating the menu 203 on the screen 200 using the input/output device 170, and then clicks the "next" button 204, the input/output device 170 displays a screen 260 on the self touch panel in step S1100.

Since the user selects a document name by operating a menu 261 using the input/output device 170, the digital document format designation unit 111 acquires the selected document name in step S1101. Document names selectable from the menu 261 are those of digital documents which have already been registered in the storage device 140.

Since the user selects generation options by operating menus 262 and 263 using the input/output device 170, the digital document format designation unit 111 acquires the selected generation options in step S1102. These generation options are parameters to be designated when the digital document generation apparatus 100 generates a digital document. This embodiment adopts, as generation options, a language type (selectable by the menu 262) upon publishing a digital document, and ON/OFF of a digital signature (selectable by the menu 263). However, different generation parameters may be used depending on the functions of the digital document generation apparatus 100. When the user clicks a "generation start" button 264 using the input/output device 170, the process in step S1103 is started.

In step S1103, the digital document format designation unit 111 registers the data acquired in steps S1101 and S1102 in the document generation option list table 115, and then issues a read instruction to the document reading unit 112. Upon reception of this read instruction, the document reading unit 112 reads the set paper document, and acquires information described on this paper document as an image. The document reading unit 112 outputs the image acquired by reading to the subsequent digital document generation unit 113, and requests it to generate a digital document.

In step S1104, the digital document generation unit 113, which received the digital document generation request, acquires the setting contents acquired by the digital document format designation unit 111 from the document generation option list table 115, and generates a digital document based on the acquired setting contents. After that, the digital document generation unit 113 acquires a folder path (field 802) using the designated public folder name (field 801) as a search key from the public folder list table 114. Then, the digital document generation unit 113 stores, as a file, the generated digital document in a corresponding folder in the storage device 140 based on the acquired folder path.

In step S1105, the digital document generation unit 113 requests the feed entry updating unit 120 to update (correct) an entry corresponding to the generated digital document in feed data of the public folder (correction request) together with the path name of the stored file.

In step S1106, the feed entry updating unit 120, which received this entry update request, requests the feed data selection unit 121 to search for feed data of the designated public folder.

In step S1107, the feed data selection unit 121, which received this search request, searches for a feed data format (field 803) and feed data path (field 804) using the public folder name as a search key with reference to the public folder list table 114. Then, the feed data selection unit 121 passes the search results to the feed entry updating unit 120.

In step S1108, the feed entry updating unit 120 searches for a feed entry corresponding to the document name of the digital document with reference to the feed data path received from the feed data selection unit 121. In this embodiment, the unit 120 searches for an entry element in which the value of a title attribute matches the document name of the digital document.

In step S1109, the feed entry updating unit 120 acquires document property values corresponding to the generation options using the document property acquisition unit 117. The document property acquisition unit 117 acquires document property setting destination nodes, setting methods, and setting values with reference to the document generation option conversion table 116. In step S1110, the feed entry updating unit 120, which acquired the document properties, searches the feed entry for a link description having the document properties.

As a result of search in step S1110, if a link description is found, the process advances to step S1112 via step S1111. On the other hand, as a result of search, if no link description is found, the process advances to step S1113 via step S1111.

In step S1112, the feed entry updating unit 120 updates a link destination address (a value of an href attribute of the link child element of the entry element). After that, the unit 120 updates a time stamp (an update child element of the entry element and an update element of the feed element).

In step S1114, the feed entry updating unit 120 stores this feed data in the storage device 140. For example, when values are set in the document generation option list table 115, as shown in FIG. 8A, and a name of a new file created by the digital document generation unit 113 is "200710050001.xps", the update result of the feed data is as shown in FIG. 6A.

On the other hand, in step S1113 the feed entry updating unit 120 adds a new link description (a link child element of the entry element) and updates a time stamp (an update child element of the entry element and an update element of the feed element). For example, when values are set in the document generation option list table 115, as shown in FIG. 8B, and a name of a new file created by the digital document generation unit 113 is "200710040001.pdf", the update result of the feed data is as shown in FIG. 6B.

Feed data reference registration processing executed when the digital document reference apparatus 150 registers a reference of feed data of the public folder of the digital document generation apparatus 100 using the feed reader 151 will be described below with reference to FIG. 13 that shows the flowchart of this processing.

In step S1201, the digital document reference apparatus 150 (a CPU (not shown) of this apparatus in practice) issues a public folder list display request of the digital document generation apparatus 100 to the feed reader 151.

In step S1202, upon reception of the request in step S1201, the feed reader 151 transmits a public folder list request to the digital document generation apparatus 100. In step S1203, the public folder list request accepting unit 122 of the digital document generation apparatus 100 receives the public folder list request transmitted by the feed reader 151. In step S1204, the public folder list request accepting unit 122 requests the public folder list screen generation unit 123 to generate a shared folder list screen.

In step S1205, the public folder list screen generation unit 123, which received the request, generates a public folder list screen with reference to the public folder list table 114, and returns the generated public folder list screen data to the public folder list request accepting unit 122. For example, when values are set in the public folder list table 114, as shown in FIG. 9A, a public folder list screen shown in FIG. 3B is generated. Note that in this embodiment, the public folder list screen is described using HTML, as shown in FIG. 3A. However, the public folder list screen may be configured using other kinds of data as long as these data formats can be interpreted by the feed reader 151.

Referring back to FIG. 13, in step S1206 the public folder list request accepting unit 122, which received the public folder list screen data, transmits this data to the digital document reference apparatus 150.

In step S1207, the feed reader 151, which received the public folder list screen data, displays a screen according to this data, i.e., the public folder list screen on a display device (not shown) or the like included in the digital document reference apparatus 150.

When the user of the digital document reference apparatus 150 designates a public folder, feed data of which is to be referred to, on this public folder list screen, the feed reader 151 accepts this designation in step S1208.

In step S1209, a link (reference information) to the feed data of the designated public folder is registered in the form of, e.g., a bookmark. A practical example of this processing will be described below using the public folder list screen shown in FIG. 3B. When the user clicks a link "update information of public folder for XXX group member" to feed data on this screen using, e.g., a mouse, the feed reader 151 registers the link to the feed data in the form of, e.g., a bookmark.

Figure 14A:
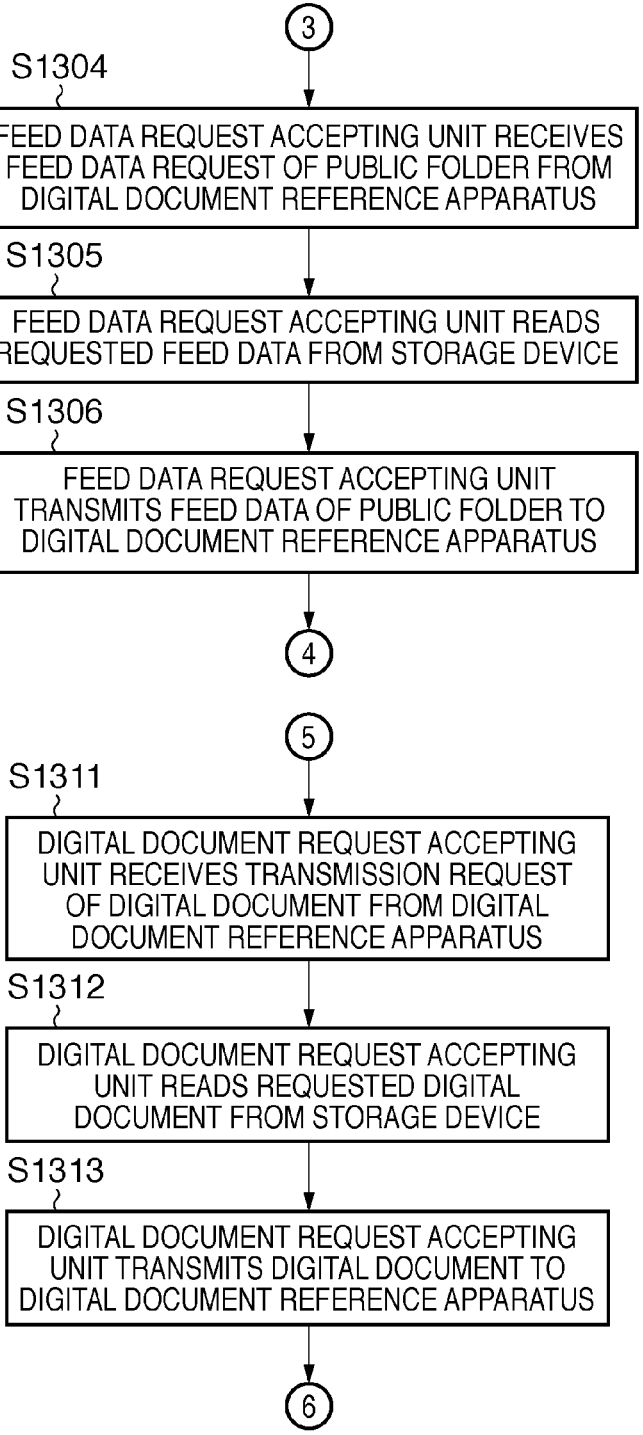

Feed data acquisition processing executed when the digital document reference apparatus 150 acquires feed data of a public folder of the digital document generation apparatus 100 using the feed reader 151 will be described below with reference to FIGS. 14A and 14B each of that shows the flowchart of this processing.

In step S1301, the feed reader 151 accepts a "display request of feed data of the registered public folder" from the user of the digital document reference apparatus 150. If the feed data as a target of the accepted display request is old one, the process jumps to step S1308 via step S1302. On the other hand, if the feed data is not old one, the process advances to step S1303 via step S1302.

Note that a judgment process as to whether or not feed data is old one is made in step S1302 in this way. However, this judgment process may be made as follows. That is, the feed reader 151 refers to an expiration date of feed data described in feed data at the time of generation or updating by the feed entry generation unit 118 or feed entry updating unit 120, and compares it with the current date and time. The expiration date in the feed data is described like "<expire>2007-10-12T12:00:00 Z</expire>" as a child element of the feed element shown in FIG. 5A. If the current date and time indicates a date and time before the expiration date, it is judged that the feed data is "not old"; if the current date and time indicates a date and time after the expiration date, it is judged that the feed data is "old".

In step S1303, the feed reader 151 requests the digital document generation apparatus 100 to transmit feed data of the public folder. Note that a feed data request of general feed data can be automatically updated at specific time intervals according to settings.

In step S1304, the feed data request accepting unit 124 of the digital document generation apparatus 100 receives the request transmitted by the feed reader 151 in step S1303. In step S1305, the feed data request accepting unit 124 searches the storage device 140 for feed data as a target of the request received in step S1304. In step S1306, the feed data request accepting unit 124 transmits the feed data found in step S1304 to the digital document reference apparatus 150.

In step S1307, the feed reader 151 of the digital document reference apparatus 150 receives the feed data transmitted in step S1306. In step S1308, the feed reader 151 analyzes this received feed data (that corresponding to the display request from the user), and displays a screen based on this feed data on, e.g., the display device (not shown) included in the digital document reference apparatus 150. Note that feed data display methods are different depending on feed readers. For example, when the feed reader 151 receives feed data shown in, e.g., FIG. 7, the screen shown in FIG. 4 is displayed on, e.g., the display device (not shown) included in the digital document reference apparatus 150.

Since the user of the digital document reference apparatus 150 designates a digital document to be acquired by, e.g., clicking a mouse button on this screen, the feed reader 151 accepts this designation in step S1309. In step S1310, the feed reader 151 transmits a digital document transmission request to the digital document generation apparatus 100 together with a URI address corresponding to the digital document as a target of the accepted designation.

In step S1311, the digital document request accepting unit 125 on the digital document generation apparatus 100 receives the transmission request transmitted in step S1310. In step S1312, the digital document request accepting unit 125 searches the digital documents 141 stored in the storage device 140 for the digital document as a target of the received transmission request. In step S1313, the digital document request accepting unit 125 transmits the found digital document to the digital document reference apparatus 150.

In step S1314, the feed reader 151 of the digital document reference apparatus 150 receives the digital document transmitted in step S1313. In step S1315, the feed reader 151 displays the received digital document on, e.g., the display device (not shown) included in the digital document reference apparatus 150. Note that when the feed reader 151 cannot display the received digital document, that document is displayed using an appropriate viewer or processing which is set in advance is executed according to the settings of the feed reader 151.

To summarize, the digital document generation apparatus 100 according to this embodiment generates a digital document based on document content information obtained by reading a paper document and instruction content information for document generation, and generates explanatory information of the paper document based on this instruction content information. Then, the apparatus 100 generates feed data as data used to notify an external apparatus of generation of the digital document with reference to the explanatory information, and transmits the feed data to the external apparatus in response to a request from the external apparatus.

Second Embodiment

Figure 15:
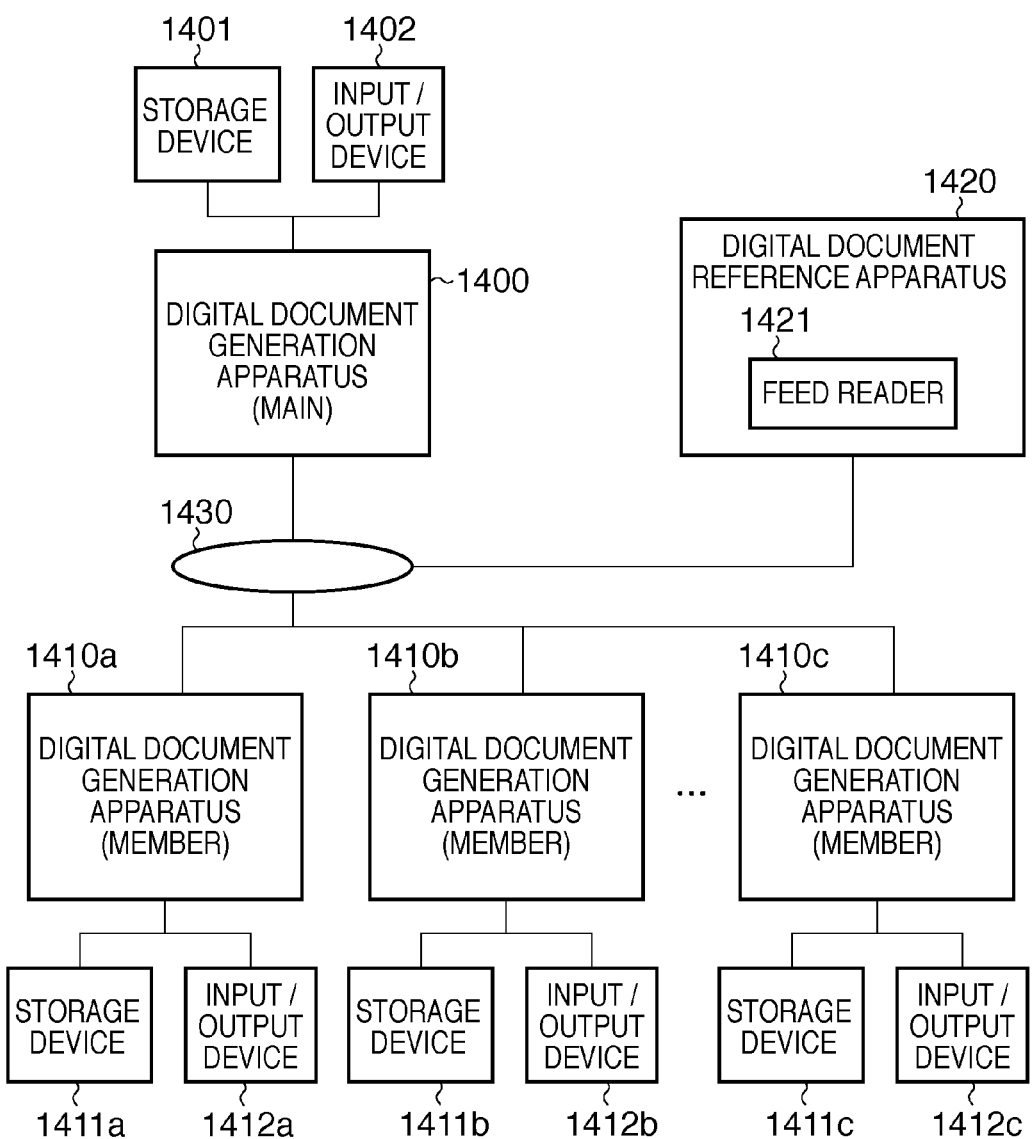
FIG. 15 is a block diagram showing an example of the arrangement of a system according to the second embodiment.

FIG. 15 is a block diagram showing an example of the arrangement of a system according to this embodiment. This system is different from the first embodiment in that a plurality of sets each including an input/output device 170, digital document generation apparatus 100, and storage device 140 shown in FIG. 1 are connected to a network. In this embodiment, with this arrangement, one public folder is configured by folders of a plurality of digital document generation apparatuses. However, a digital document reference apparatus can acquire feed data of a public folder from a single digital document generation apparatus as in the first embodiment.

Referring to FIG. 15, a digital document generation apparatus 1400, and digital document generation apparatuses 1410a to 1410c are the same as the digital document generation apparatus 100 shown in FIG. 1. However, the digital document generation apparatus 1400 is different from the first embodiment in that it holds feed data of not only the self apparatus but also other digital document generation apparatuses.

The digital document generation apparatus 1400 includes a storage device 1401 which stores generated digital documents and feed data, and an input/output device 1402 used by the user to issue a digital document generation instruction.

The digital document generation apparatus 1410a includes a storage device 1411a which stores generated digital documents, and an input/output device 1412a used by the user to issue a digital document generation instruction. The same applies to the remaining digital document generation apparatuses 1410b and 1410c. The digital document generation apparatuses 1400 and 1410a to 1410c, and a digital document reference apparatus 1420 are connected to a network 1430.

FIG. 16 is a block diagram showing an example of the hardware arrangement of a digital document generation apparatus 1500 which is applicable to the digital document generation apparatuses 1410a to 1410c. As shown in FIG. 16, the digital document generation apparatus 1500 includes a memory 1510 and CPU 1530. Furthermore, to this digital document generation apparatus 1500, a storage device 1540 and input/output device 1570 are connected.

The input/output device 1570 includes a display screen of a touch panel type, a keyboard, and a mouse. Upon operation by the user, the input/output device 1570 can input various instructions to the CPU 1530, and can make various displays.

The storage device 1540 stores digital documents 1541 generated by the digital document generation apparatus 1500. Of course, this storage device 1540 may store information required in processes to be described later. In this embodiment, this storage device 1540 includes a hard disk drive, but it may include other kinds of storage devices such as a CD-ROM and DVD-ROM. The memory 1510 stores respective units to be listed below in the form of computer programs:

a digital document format designation unit 1511;
a document reading unit 1512;
a digital document generation unit 1513;
a document property acquisition unit 1517;
a feed entry generation request unit 1518;
a feed entry update request unit 1520; and
a digital document request accepting unit 1525.

Furthermore, the memory 1510 stores respective units to be listed below in the form of data:

a public folder list table 1514;
a document generation option list table 1515; and
a document generation option conversion table 1516.

The digital document format designation unit 1511 makes various settings about a digital document which is acquired from a paper document by the digital document generation apparatus 1500. The document generation option list table 1515 is used to register setting information set by the digital document format designation unit 1511.

The document reading unit 1512 acquires information recorded on a paper document set on the digital document generation apparatus 1500 as an image, and outputs the acquired image to the digital document generation unit 1513 to request it to generate a digital document. The digital document generation unit 1513 generates a digital document based on the image acquired by the document reading unit 1512, and stores the generated digital document in the storage device 1540 as a digital document 1541.

The public folder list table 1514 describes correspondence relationship information between public folder names published to the digital document reference apparatus 1420 and folder paths on the storage device 1540. The document property acquisition unit 1517 acquires document properties used in feed data from document generation options.

The document generation option conversion table 1516 describes correspondence relationship information between document generation options and document properties used in feed data. The feed entry generation request unit 1518 issues an addition request of new entry data to the digital document generation apparatus 1400.

The feed entry update request unit 1520 issues an update request of a description of a feed entry to the digital document generation apparatus 1400. Note that, for example, both of the addition request and update request are issued using the ATOM Publishing Protocol in this embodiment. The digital document request accepting unit 1525 accepts a digital document request from the digital document reference apparatus 1420, and transmits a digital document corresponding to this request to the digital document reference apparatus 1420.

Note that the aforementioned units described as those stored in the memory 1510 implement their functions when they are executed by the CPU 1530. In the following description, the respective units stored in the memory 1510 serve as main bodies of processes for the sake of descriptive convenience. However, in practice, the CPU 1530 serves as a main body of the processes.

FIG. 9B shows an example of the configuration of the public folder list table 1514. As in the public folder list table 114 shown in FIG. 1, the public folder list table 1514 includes a folder name (field 1601), folder path (field 1602), feed data format (field 1603), and feed data path (field 1605) of a public folder. However, in addition to the above fields, the public folder list table 1514 also includes a digital document generation apparatus (main) name (field 1604) which indicates a transmission destination of the new addition request and update request of a feed entry by the feed entry generation request unit 1518 and feed entry update request unit 1520.

On the other hand, the digital document generation apparatus 1400 has the same arrangement as that of the first embodiment shown in FIG. 1, except for the following point. That is, especially, the feed entry generation request unit 1518 and feed entry update request unit 1520 include functions of accepting a new addition request and update request of a feed entry not only from the digital document generation apparatus 1400 but also from the digital document generation apparatuses 1410a to 1410c. The digital document reference apparatus 1420 and a feed reader 1421 are the same as the digital document reference apparatus 150 and feed reader 151 described in the first embodiment.

The processes executed by the digital document generation apparatuses 1410a to 1410c are the same as the first embodiment except for the following points. That is, a feed entry addition request issued in step S1005 is issued not by the self apparatus but by the digital document generation apparatus 1400, and a feed entry update request issued in step S1105 is issued not by the self apparatus but by the digital document generation apparatus 1400.

According to the aforementioned embodiments, a digital document can be automatically generated and published as document information that can be referred to by a general feed reader such as a Web browser together with document information including a document format and ON/OFF of a digital signature, which are designated at the time of generation.

Also, pieces of update information of digital documents generated by the plurality of digital document generation apparatuses connected via the network are combined as feed data of a single public folder, which can be referred to by the feed reader.

In this way, update information of digital documents can be prevented from being frequently sent to an apparatus on the reference side which need not frequently confirm updating of digital documents and that on the reference side which requires only latest update information of digital documents. Therefore, these apparatuses on the reference side can refer to digital document update information using feed readers at frequencies that they want. Using a feed reader of the apparatus on the reference side, a required digital document of the latest version can be easily selected and downloaded.

Furthermore, even when a plurality of notification destinations of update information to the apparatuses on the reference side are set, since notification mail messages need not be sent to the apparatuses on the reference side at one time, the loads on the digital document generation apparatus and network at the time of updating a digital document can be prevented from being concentrated in a certain period.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2009-141618 filed Jun. 12, 2009 which is hereby incorporated by reference herein in its entirety.

What is claimed is:

1. An image processing apparatus comprising:
a receiving unit which receives a paper document from a user and receives instruction information used for generating a digital document from the paper document;
a first generating unit that generates, from the paper document received by said receiving unit, the digital document based on the instruction information received by said receiving unit;
a second generating unit that generates feed data, including the instruction information received by said receiving unit, for notifying an external apparatus of the digital document generated by said first generating unit;
a registration unit that registers the digital document generated from the received paper document into a holding unit that stores the digital document, wherein said registration unit registers the generated digital document as a new document or in relation to a previously registered digital document; and
a transmitting unit that (1) transmits, in response to a request from the external apparatus, the feed data generated by said second generating unit to the external apparatus, and (2) transmits, after the feed data is transmitted to the external apparatus and in response to a request from the external apparatus for the generated digital document, the generated digital document to the external apparatus,
wherein when said registration unit overwrites the digital document on a registered digital document already registered in the holding unit or registers the digital document as another version of the registered digital document into the holding unit, said second generation unit generates the feed data of the digital document by updating reference information to the registered digital document to reference information to the digital document if the feed data of the registered digital document includes the reference information to the registered digital document or generates the feed data of the digital document by adding the reference information to the digital document into the feed data of the registered digital document if the feed data of the registered digital document does not include the reference information to the registered digital document.

2. The apparatus according to claim 1, further comprising a unit that corrects corresponding feed data when a digital document which has already been registered in the image processing apparatus is updated or a digital document is additionally registered.

3. The apparatus according to claim 2, further comprising a unit that, when another image processing apparatus on a network updates or adds a digital document, receives a correction request of feed data transmitted from the other image processing apparatus, and corrects a description of feed data corresponding to the digital document.

4. The apparatus according to claim 2, further comprising a unit that transmits a correction request of a description of feed data to another image processing apparatus on a network when a digital document is updated or added.

5. The apparatus according to claim 4, wherein the correction request is issued using an ATOM Publishing Protocol.

6. The apparatus according to claim 1, further comprising a unit that generates a folder list window including reference information to feed data of respective storage folders, when a list request of a storage folder of digital documents is received from a publishing destination of the digital documents.

7. The apparatus according to claim 6, wherein the folder list window is described using HTML.

8. The apparatus according to claim 1, further comprising a unit that, when another image processing apparatus on a network generates a new digital document, receives an addition request of feed data transmitted from the other image processing apparatus, and adds a description of feed data corresponding to the digital document.

9. The apparatus according to claim 1, further comprising a unit that transmits an addition request of a description of feed data to another image processing apparatus on a network when a new digital document is created.

10. The apparatus according to claim 9, wherein the addition request is issued using an ATOM Publishing Protocol.

11. The apparatus according to claim 1, wherein the feed data is described in an ATOM Syndication Format or an RSS format.

12. The apparatus according to claim 1, further comprising a unit that registers the generated digital document into a folder being specified in the digital document information, wherein the feed data corresponds to the folder.

13. The apparatus according to claim 1, wherein the instruction information relates to a document format of the digital document.

14. An image processing method comprising the steps of:
receiving a paper document from a user and receiving instruction information used for generating a digital document from the paper document;
generating, from the paper document received in said receiving step, the digital document based on the instruction information received in said receiving step;
generating feed data, including the instruction information received in said receiving step, for notifying an external apparatus of the digital document generated in said first generating step;
registering the digital document generated from the received paper document into a holding unit that stores the digital document, wherein said registration step registers the generated digital document as a new document or in relation to a previously registered digital document;
transmitting, in response to a request from the external apparatus, the feed data generated in said second generating step to the external apparatus, and
transmitting, after the feed data is transmitted to the external apparatus and in response to a request from the external apparatus for the generated digital document, the generated digital document to the external apparatus,
wherein, when in said registering step, the digital document on a registered digital document already registered in the holding unit is overwritten or the digital document is registered as another version of the registered digital document into the holding unit, then said second generating of feed data includes generating the feed data of the digital document by updating reference information to the registered digital document to reference information to the digital document if the feed data of the registered digital document includes the reference information to the registered digital document, or generating the feed data of the digital document by adding the reference information to the digital document into the feed data of the registered digital document if the feed data of the registered digital document does not include the reference information to the registered digital document.

15. The method according to claim 14, further comprising the step of registering the generated digital document into a folder being specified in the digital document information, wherein the feed data corresponds to the folder.

16. The method according to claim 14, wherein the instruction information relates to a document format of the digital document.

17. A non-transitory computer-readable storage medium storing, in executable form, a computer program causing a computer to function as said units of an image processing apparatus according to claim 1.

* * * * *